United States Patent
Lee et al.

(10) Patent No.: US 10,154,537 B2
(45) Date of Patent: Dec. 11, 2018

(54) METHOD AND APPARATUS FOR CANCELING TRIGGERED PROSE BSR IN WIRELESS COMMUNICATION SYSTEM

(71) Applicant: LG ELECTRONICS INC., Seoul (KR)

(72) Inventors: Youngdae Lee, Seoul (KR); Seungjune Yi, Seoul (KR); Sunghoon Jung, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/509,131

(22) PCT Filed: Sep. 25, 2015

(86) PCT No.: PCT/KR2015/010157
§ 371 (c)(1),
(2) Date: Mar. 6, 2017

(87) PCT Pub. No.: WO2016/048082
PCT Pub. Date: Mar. 31, 2016

(65) Prior Publication Data
US 2017/0280486 A1  Sep. 28, 2017

Related U.S. Application Data

(60) Provisional application No. 62/054,983, filed on Sep. 25, 2014, provisional application No. 62/055,603, filed on Sep. 25, 2014.

(51) Int. Cl.
*H04W 76/40* (2018.01)
*H04W 72/02* (2009.01)
(Continued)

(52) U.S. Cl.
CPC ....... *H04W 76/40* (2018.02); *H04W 28/0231* (2013.01); *H04W 28/0278* (2013.01);
(Continued)

(58) Field of Classification Search
None
See application file for complete search history.

(56) References Cited

U.S. PATENT DOCUMENTS 8,743,814 B2    6/2014  Kim
2012/0307767 A1* 12/2012 Yamada ............... H04W 74/02
                                                    370/329
(Continued)

FOREIGN PATENT DOCUMENTS

WO    WO 2014003327 A1 *  1/2014  ........ H04W 52/0238

OTHER PUBLICATIONS

Korean_Applicatation_20140102128(Translation), Aug. 2014, all pages.*

(Continued)

*Primary Examiner* — Chirag G Shah
*Assistant Examiner* — Srinivasa R Reddivalam
(74) *Attorney, Agent, or Firm* — Birch, Stewart, Kolasch & Birch, LLP

(57) ABSTRACT

A method and apparatus for canceling a proximity-based services (ProSe) buffer status report (BSR) in a wireless communication system is provided. A user equipment (UE) triggers at least one ProSe BSR, and cancels all triggered ProSe BSRs when one of events occur. The one of events may include that a physical layer problem or a radio link failure is detected. Further, during canceling all triggered ProSe BSRs, all pending scheduling requests (SRs) may not be canceled.

11 Claims, 5 Drawing Sheets

(51) Int. Cl.
    *H04W 28/02*      (2009.01)
    *H04W 72/12*      (2009.01)
    *H04W 76/14*      (2018.01)
    *H04W 72/04*      (2009.01)

(52) U.S. Cl.
    CPC ........... *H04W 72/02* (2013.01); *H04W 72/12* (2013.01); *H04W 72/1242* (2013.01); *H04W 28/02* (2013.01); *H04W 72/04* (2013.01); *H04W 76/14* (2018.02)

(56) References Cited

U.S. PATENT DOCUMENTS

| | | | |
|---|---|---|---|
| 2014/0010179 A1 | 1/2014 | Lee | |
| 2014/0023008 A1 | 1/2014 | Ahn et al. | |
| 2015/0326484 A1* | 11/2015 | Cao | H04L 47/30 370/329 |
| 2016/0014794 A1* | 1/2016 | Wu | H04W 72/10 370/329 |
| 2016/0044737 A1* | 2/2016 | Kwon | H04W 76/028 370/328 |
| 2016/0081108 A1* | 3/2016 | Tseng | H04W 72/1242 370/329 |
| 2016/0212661 A1* | 7/2016 | Basu Mallick | H04L 1/1614 |
| 2017/0142741 A1* | 5/2017 | Kaur | H04W 72/121 |

OTHER PUBLICATIONS

3GPP TS 36.321 V12.2.0 (Jun. 2014); 3rd Generation Partnership Project; Technical Specification Group Radio Access Network; Evolved Universal Terrestrial Radio Access (E-UTRA); Medium Access Control (MAC) protocol specification (Release 12), pp. 1-2 and 27-28.

Huawei et al., "ProSe-BSR Triggering and Cancelling Mechanisms", R2-143458, 3GPP TSG RAN WG2 Meeting #87, Dresden, Germany, Aug. 18-Aug. 22, 2014. (http://www.3gpp.org/ftp/tsg_ran/WG2_RL2/TSGR2_87/Docs/), See sections 1-4.

* cited by examiner

[Fig. 1]
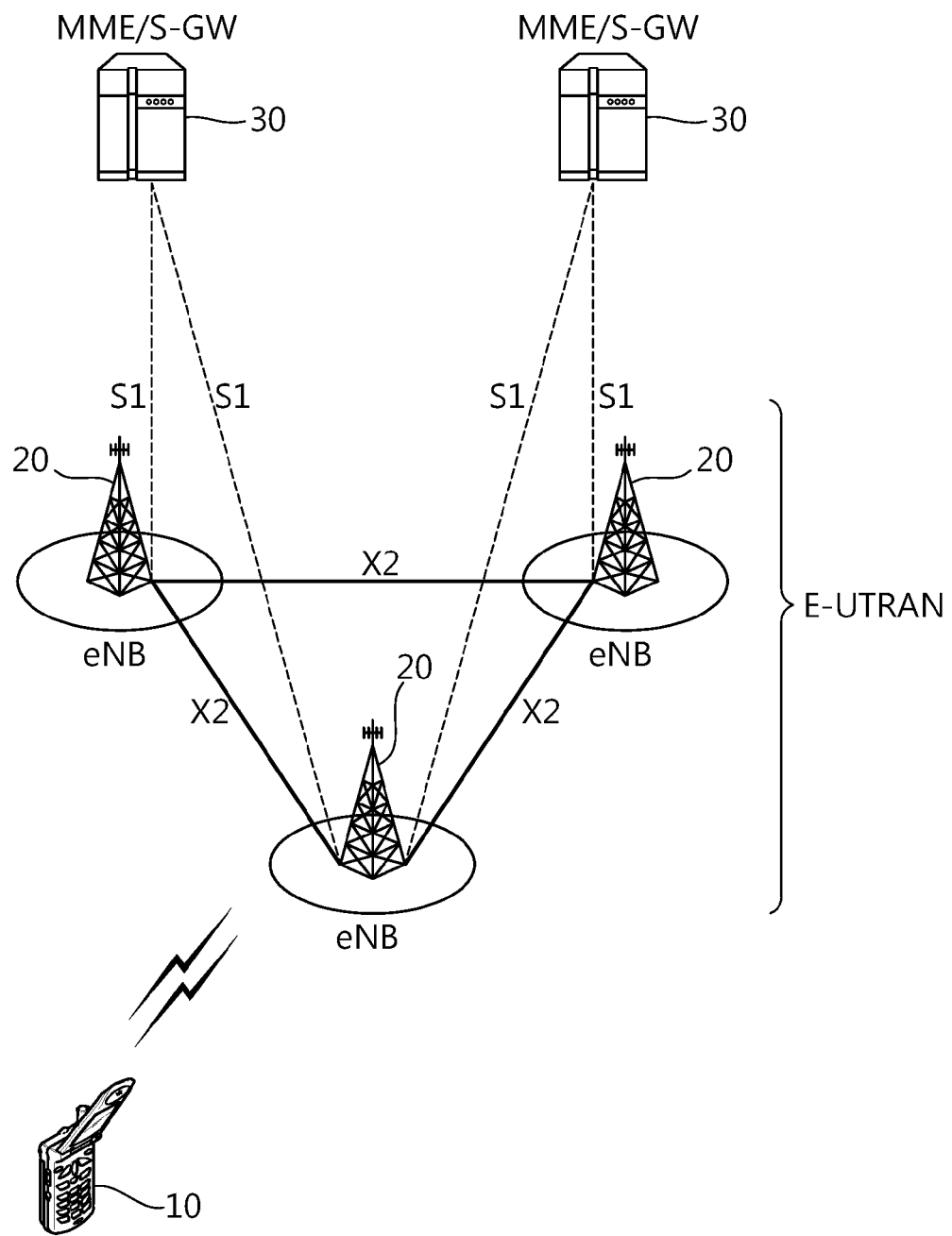

[Fig. 2]
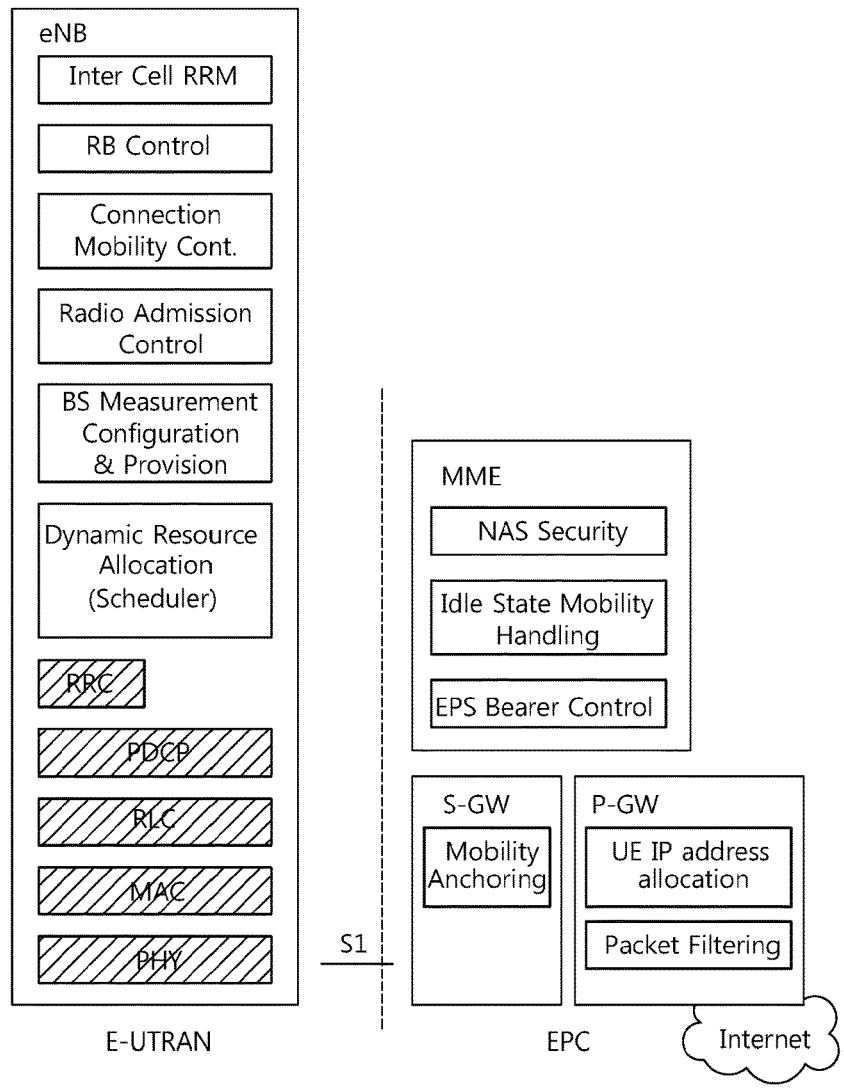
[Fig. 3]
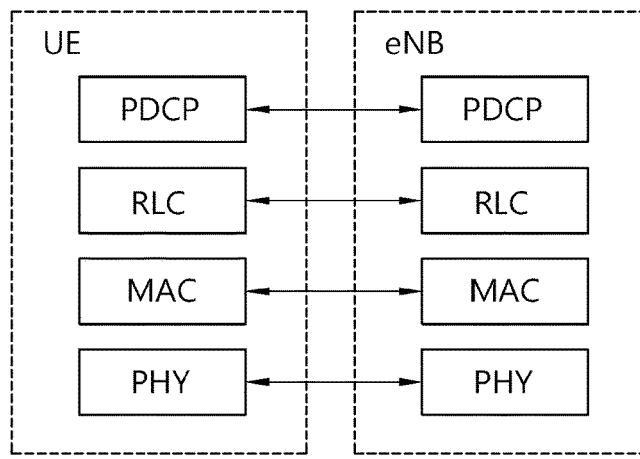

[Fig. 4]
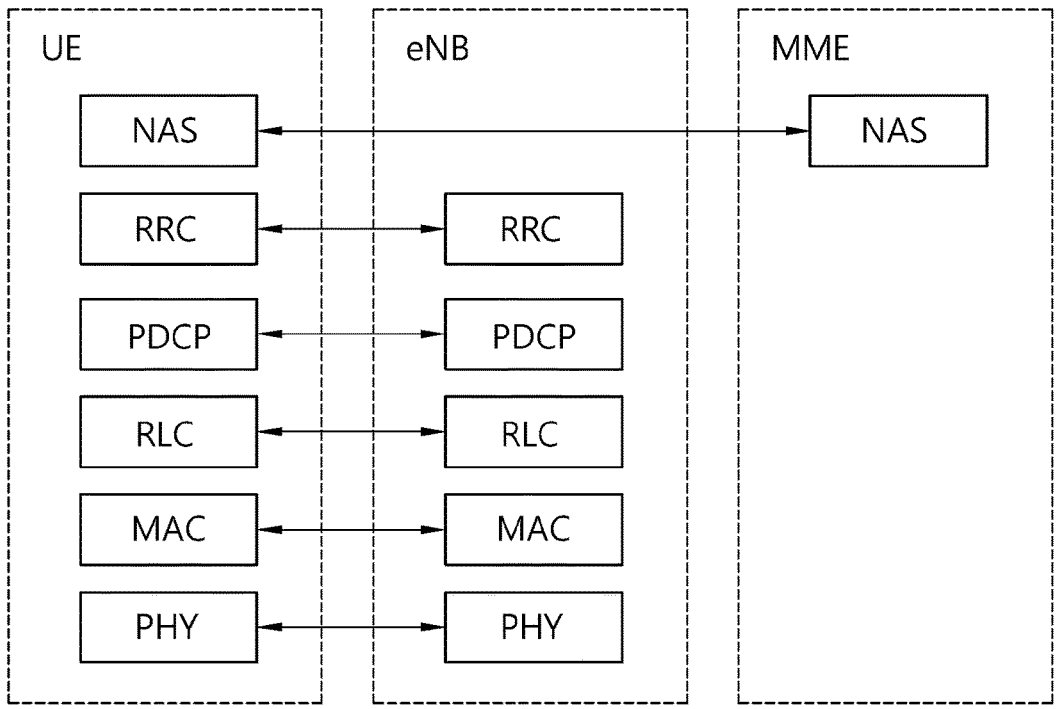
[Fig. 5]
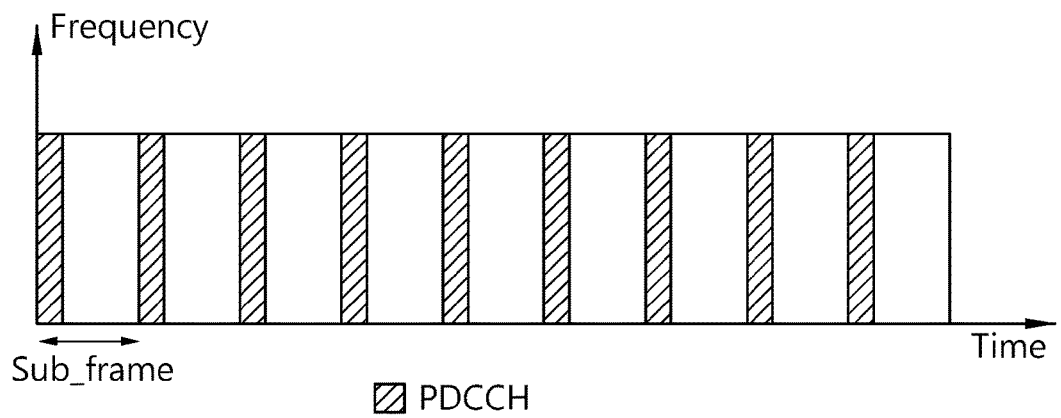
[Fig. 6]
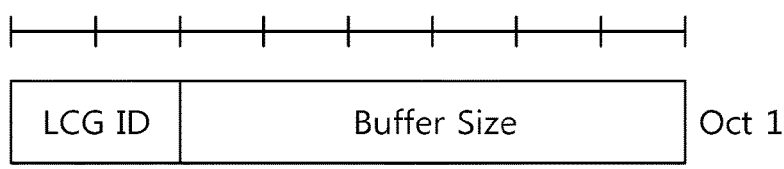

[Fig. 7]
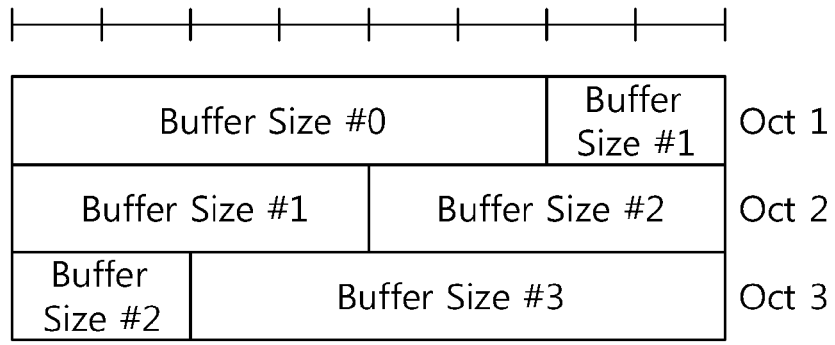
[Fig. 8]
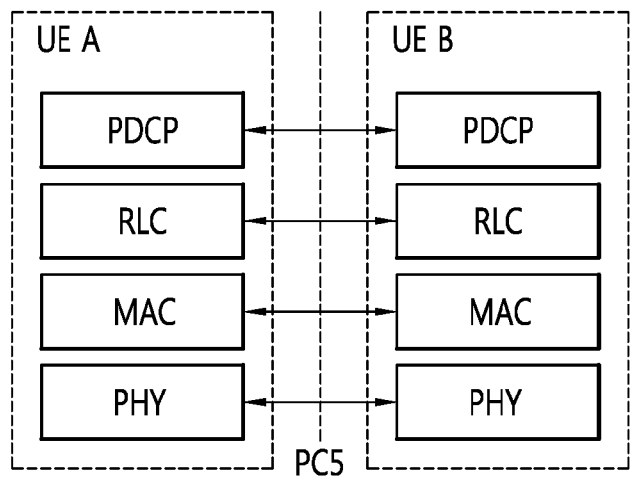
[Fig. 9]
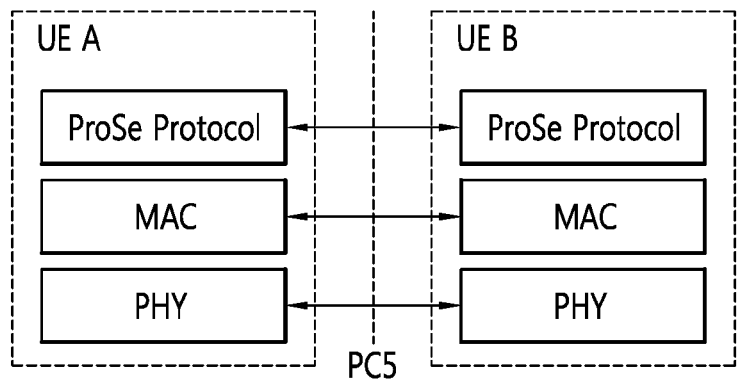

[Fig. 10]
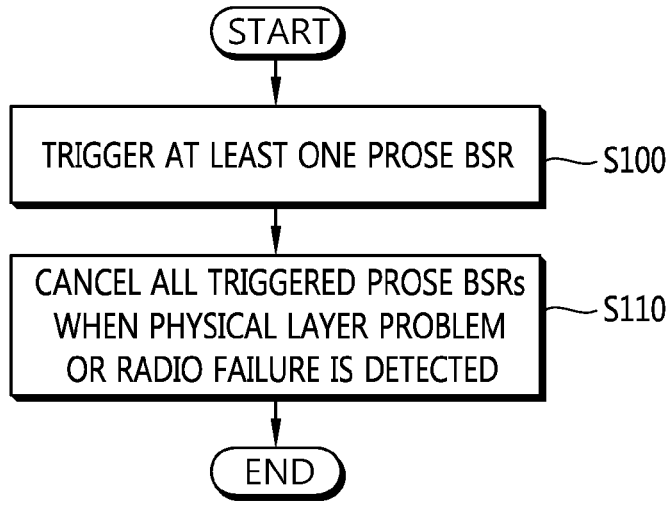
[Fig. 11]
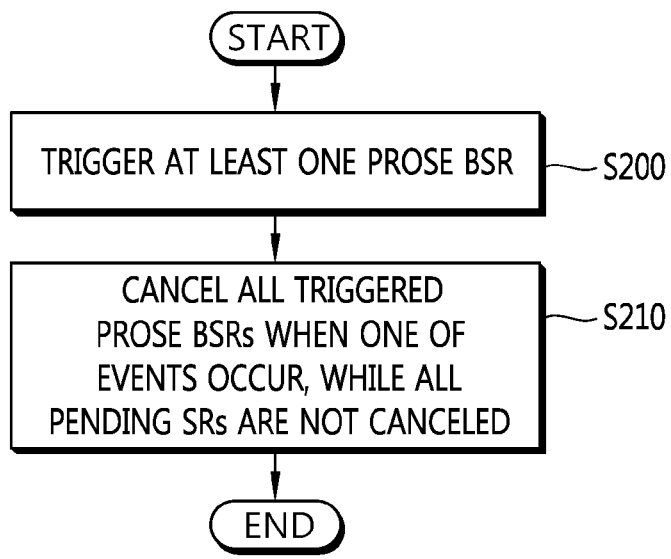
[Fig. 12]
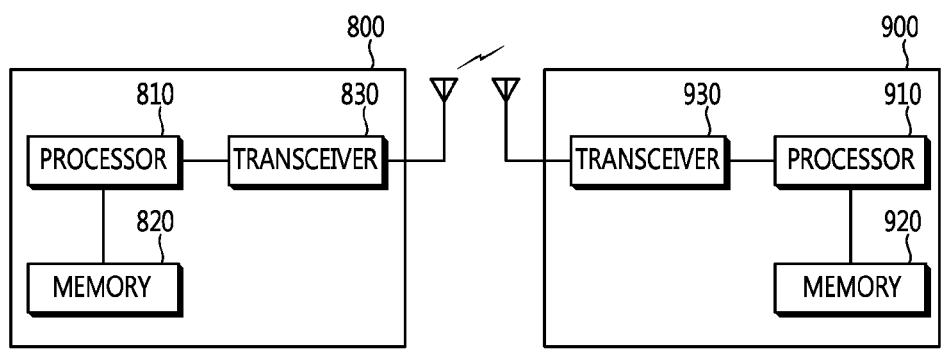

METHOD AND APPARATUS FOR CANCELING TRIGGERED PROSE BSR IN WIRELESS COMMUNICATION SYSTEM

CROSS REFERENCE TO RELATED APPLICATIONS

This application is the National Phase of PCT International Application No. PCT/KR2015/010157, filed on Sep. 25, 2015, which claims priority under 35 U.S.C. 119(e) to U.S. Provisional Application Nos. 62/054,983, filed on Sep. 25, 2014 and 62/055,603 filed on Sep. 25, 2014, all of which are hereby expressly incorporated by reference into the present application.

TECHNICAL FIELD

The present invention relates to wireless communications, and more particularly, to a method and apparatus for canceling triggered proximity-based services (ProSe) buffer status reports (BSRs) upon de-configuration or fallback to mode 2 in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the underutilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

A buffer status reporting (BSR) procedure is used to provide the serving eNB with information about the amount of data available for transmission in the UL buffers of the UE. A method for performing BSR procedure when ProSe is introduced may be required.

DISCLOSURE OF INVENTION

Technical Problem

The present invention provides a method and apparatus for canceling triggered proximity-based services (ProSe) buffer status reports (BSRs) upon de-configuration or fallback to mode 2 in a wireless communication system. The present invention provides a method and apparatus for canceling triggered ProSe BSRs when a physical layer problem or a radio link failure is detected. The present invention provides a method and apparatus for canceling triggered ProSe BSRs while all pending scheduling requests (SRs) are not canceled.

Solution to Problem

In an aspect, a method for canceling, by a user equipment (UE), a proximity-based services (ProSe) buffer status report (BSR) in a wireless communication system is provided. The method includes triggering at least one ProSe BSR, and canceling all triggered ProSe BSRs when a physical layer problem or a radio link failure is detected.

In another aspect, a method for canceling, by a user equipment (UE), a proximity-based services (ProSe) buffer status report (BSR) in a wireless communication system is provided. The method includes triggering at least one ProSe BSR, and canceling all triggered ProSe BSRs when one of events occur, while all pending scheduling requests (SRs) are not canceled.

Advantageous Effects of Invention

Triggered ProSe BSRs can be canceled efficiently.

BRIEF DESCRIPTION OF DRAWINGS

FIG. 1 shows LTE system architecture.
FIG. 2 shows a block diagram of architecture of a typical E-UTRAN and a typical EPC.
FIG. 3 shows a block diagram of a user plane protocol stack of an LTE system.
FIG. 4 shows a block diagram of a control plane protocol stack of an LTE system.
FIG. 5 shows an example of a physical channel structure.
FIG. 6 shows an example of a short BSR and truncated BSR MAC CE.
FIG. 7 shows an example of a long BSR MAC CE.
FIG. 8 shows an example of a user plane protocol stack for ProSe direct communication.
FIG. 9 shows an example of PC interface for ProSe direct discovery.
FIG. 10 shows an example of a method for canceling a ProSe BSR according to an embodiment of the present invention.
FIG. 11 shows another example of a method for canceling a ProSe BSR according to an embodiment of the present invention.
FIG. 12 shows a wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Buffer status reporting (BSR) is described. It may be referred to Section 5.4.5 of 3GPP TS 36.321 V12.2.0 (2014-06). RRC controls BSR reporting by configuring the two timers periodicBSR-Timer and retxBSR-Timer and by, for each logical channel, optionally signaling logicalChannelGroup which allocates the logical channel to a logical channel group (LCG). For the BSR procedure, the UE shall consider all radio bearers which are not suspended and may consider radio bearers which are suspended.

A BSR shall be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "regular BSR";

UL resources are allocated and number of padding bits is equal to or larger than the size of the BSR MAC control element (CE) plus its subheader, in which case the BSR is referred below to as "padding BSR";

retxBSR-Timer expires and the UE has data available for transmission for any of the logical channels which belong to a LCG, in which case the BSR is referred below to as "regular BSR";

periodicBSR-Timer expires, in which case the BSR is referred below to as "periodic BSR".

For regular and periodic BSR, if more than one LCG has data available for transmission in the TTI where the BSR is transmitted, long BSR is reported. Else, short BSR is reported.

For padding BSR, if the number of padding bits is equal to or larger than the size of the short BSR plus its subheader but smaller than the size of the long BSR plus its subheader, and if more than one LCG has data available for transmission in the TTI where the BSR is transmitted, truncated BSR of the LCG with the highest priority logical channel with data available for transmission is reported. Else, short BSR is reported. Else if the number of padding bits is equal to or larger than the size of the Long BSR plus its subheader, long BSR is reported.

If the BSR procedure determines that at least one BSR has been triggered and not canceled, and if the UE has UL resources allocated for new transmission for this TTI, the UE instruct the multiplexing and assembly procedure to generate the BSR MAC CE(s), starts or restarts periodicBSR-Timer except when all the generated BSRs are truncated BSRs, and start or restart retxBSR-Timer. Else if a regular BSR has been triggered, and if an UL grant is not configured or the regular BSR was not triggered due to data becoming available for transmission for a logical channel for which logical channel SR masking (logicalChannelSR-Mask) is setup by upper layers, a scheduling request shall be triggered.

A MAC PDU shall contain at most one MAC BSR CE, even when multiple events trigger a BSR by the time a BSR can be transmitted in which case the regular BSR and the periodic BSR shall have precedence over the padding BSR.

The UE shall restart retxBSR-Timer upon indication of a grant for transmission of new data on any UL-SCH.

All triggered BSRs shall be canceled in case the UL grant(s) in this subframe can accommodate all pending data available for transmission but is not sufficient to additionally accommodate the BSR MAC CE plus its subheader. All triggered BSRs shall be canceled when a BSR is included in a MAC PDU for transmission.

The UE shall transmit at most one regular/periodic BSR in a TTI. If the UE is requested to transmit multiple MAC PDUs in a TTI, it may include a padding BSR in any of the MAC PDUs which do not contain a regular/periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

BSR MAC CE consist of either:

Short BSR and truncated BSR format: one LCG ID field and one corresponding buffer size field; or Long BSR format: four buffer size fields, corresponding to LCG IDs #0 through #3.

FIG. 6 shows an example of a short BSR and truncated BSR MAC CE. FIG. 7 shows an example of a long BSR MAC CE.

The BSR formats are identified by MAC PDU subheaders with logical channel IDs (LCIDs).

The fields LCG ID and buffer size are defined as follow:

LCG ID: The logical channel group ID field identifies the group of logical channel(s) which buffer status is being reported. The length of the field is 2 bits;

Buffer size: The buffer size field identifies the total amount of data available across all logical channels of a logical channel group after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits. If extendedBSR-Sizes is not configured, the values taken by the buffer size field are shown in Table 1 below. If extendedBSR-Sizes is configured, the values taken by the buffer size field are shown in Table 2 below.

TABLE 1

| Index | Buffer Size (BS) value [bytes] |
| --- | --- |
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |

TABLE 1-continued

| Index | Buffer Size (BS) value [bytes] |
|---|---|
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

TABLE 2

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |

TABLE 2-continued

| Index | Buffer Size (BS) value [bytes] |
|---|---|
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

Proximity-based services (ProSe) are described. "ProSe" may be used mixed with "D2D". ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity. ProSe UE identity (ID) is a unique identity allocated by evolved packet system (EPS) which identifies the ProSe enabled UE. ProSe application ID is an identity identifying application related information for the ProSe enabled UE.

ProSe direct communication is a mode of communication whereby two public safety UEs can communicate with each other directly over the PC5 interface. This communication mode is supported when the UE is served by E-UTRAN and when the UE is outside of E-UTRA coverage. A transmitter UE transmits scheduling assignment (SA) to indicate the resources it is going to use for data transmission to the receiver UEs.

FIG. 8 shows an example of a user plane protocol stack for ProSe direct communication. The UE radio protocol architecture for ProSe direct communication is given for the user plane and the control plane. Referring to FIG. 8, PDCP, RLC and MAC sublayers (terminate at the other UE) perform the functions listed for the user plane, e.g. header compression, HARQ retransmissions. The PC5 interface consists of PDCP, RLC, MAC and PHY.

User plane details of ProSe direct communication is described. There is no HARQ feedback for ProSe direct communication. MAC sub header contains LCIDs to differentiate multiple logical channels. The MAC header comprises a source Layer-2 ID and a destination Layer-2 ID. At MAC multiplexing/de-multiplexing, priority handling and padding are useful for ProSe direct communication. RLC unacknowledged mode (UM) is used for ProSe direct communication. Segmentation and reassembly of RLC service data units (SDUs) are performed. A receiving UE needs to maintain at least one RLC UM entity per transmitting peer UE. An RLC UM receiver entity does not need to be configured prior to reception of the first RLC UM data unit. U-Mode is used for header compression in PDCP for ProSe direct communication.

A UE may establish multiple logical channels. LCID included within the MAC subheader uniquely identifies a logical channel within the scope of one source layer-2 ID and destination Layer-2 ID combination. All logical channels are mapped to one specified logical channel group (e.g. LCGID 3).

For ProSe direct communication, the ProSe-enabled UE can operate in two modes for resource allocation, which include Mode 1 (eNB scheduled resource allocation) and Mode 2 (UE autonomous resource selection). In Mode 1, the UE needs to be RRC_CONNECTED in order to transmit data. The UE requests transmission resources from the eNB. The eNB schedules transmission resources for transmission of scheduling assignment(s) and data. The UE sends a scheduling request (dedicated scheduling request (D-SR) or random access) to the eNB followed by a ProSe BSR. Based on the BSR, the eNB can determine that the UE has data for a ProSe direct communication transmission and estimate the resources needed for transmission. In Mode 2, a UE on its own selects resources from resource pools to transmit scheduling assignment and data.

A UE is considered in-coverage if it has a serving cell (i.e. the UE is RRC_CONNECTED or is camping on a cell in RRC_IDLE). If the UE is out of coverage, it can only use Mode 2. If the UE is in coverage, it may use Mode 1 if the eNB configures it accordingly. If the UE is in coverage, it may use Mode 2 if the eNB configures it accordingly. When there are no exceptional conditions, the UE changes from Mode 1 to Mode 2 or Mode 2 to Mode 1 only if it is configured by eNB to do so. If the UE is in coverage, it shall use only the mode indicated by eNB configuration unless one of the exceptional cases occurs. The UE considers itself to be in exceptional conditions while T311 or T301 is running. When an exceptional case occurs, the UE is allowed to use Mode 2 temporarily even though it was configured to use Mode 1.

While being in the coverage area of an E-UTRA cell, the UE shall perform ProSe direct communication transmission on the UL carrier only on the resources assigned by that cell, even if resources of that carrier have been pre-configured, e.g. in universal integrated circuit card (UICC).

For UEs in RRC_IDLE, the eNB may provide a Mode 2 transmission resource pool in system information block (SIB). UEs that are authorized for ProSe direct communication use these resources for ProSe direct communication in RRC IDLE. Alternatively, the eNB may indicate in SIB that it supports ProSe direct communication but does not provide resources for it. UEs need to enter RRC_CONNECTED to perform ProSe direct communication transmission.

For UEs in RRC_CONNECTED, a UE in RRC_CONNECTED that is authorized to perform ProSe direct communication transmission indicates to the eNB that it wants to perform ProSe direct communication transmissions. The eNB validates whether the UE in RRC_CONNECTED is authorized for ProSe direct communication transmission using the UE context received from MME. The eNB may configure a UE in RRC_CONNECTED by dedicated signaling with a Mode 2 resource allocation transmission resource pool that may be used without constraints while the UE is RRC_CONNECTED. Alternatively, the eNB may configure a UE in RRC_CONNECTED by dedicated signaling with a Mode 2 resource allocation transmission resource pool which the UE is allowed to use only in exceptional cases and rely on Mode 1 otherwise.

The resource pool for scheduling assignment when the UE is out of coverage can be pre-configured for reception and transmission. The resource pool for scheduling assignment when the UE is in coverage can be configured as follows. The resource pool used for reception is configured by the eNB via RRC, in dedicated or broadcast signaling. The resource pool used for transmission is configured by the eNB via RRC if Mode 2 resource allocation is used. The SA resource pool for transmission is not known to the UE if Mode 1 resource allocation is used. The eNB schedules the specific resource(s) to use for scheduling assignment transmission if Mode 1 resource allocation is used. The specific resource assigned by the eNB is within the resource pool for reception of scheduling assignment that is provided to the UE.

In order to perform communication even when some UEs are in-coverage and some UEs are out of coverage, all UEs (i.e. both in and out of coverage) should monitor resource pool for scheduling assignment which is the union of the resource pools used for transmission of scheduling assignment in all (or some of the when in-coverage) cells and transmission of scheduling assignment out of coverage.

ProSe direct discovery is defined as the procedure used by the ProSe-enabled UE to discover other ProSe-enabled UE(s) in its proximity using E-UTRA direct radio signals via PC5. ProSe direct discovery is supported only when the UE is served by E-UTRAN.

FIG. 9 shows an example of PC interface for ProSe direct discovery. Referring to FIG. 9, UE A and UE B perform ProSe direct discovery using ProSe protocol via PC5. Upper layer handles authorization for announcement and monitoring of discovery information. Content of discovery information is transparent to AS and no distinction in AS is made for ProSe direct discovery models and types of ProSe direct discovery. The ProSe protocol ensures that it delivers only valid discovery information to AS for announcement. The UE can participate in announcing and monitoring of discovery information in both RRC_IDLE and RRC_CONNECTED state as per eNB configuration. The UE announces and monitors its discovery information subject to the half-duplex constraint. Announcing and monitoring UE maintains the current coordinated universal time (UTC) time. Announcing UE transmits the discovery message which is generated by the ProSe protocol taking into account the UTC time upon transmission of the discovery message. In the monitoring UE, the ProSe protocol provides the message to be verified together with the UTC time upon reception of the message to the ProSe function.

Radio protocol stack (AS) for ProSe direct discovery consists of only MAC and PHY. The AS layer performs interfaces with upper layer (ProSe Protocol). The MAC layer receives the discovery information from the upper layer (ProSe Protocol). The IP layer is not used for transmitting the discovery information. The AS layer also performs scheduling. The MAC layer determines the radio resource to be used for announcing the discovery information received from upper layer. The AS layer also performs discovery PDU generation. The MAC layer builds the MAC PDU carrying the discovery information and sends the MAC PDU to the physical layer for transmission in the determined radio resource. No MAC header is added.

There are two types of resource allocation for discovery information announcement, which include Type 1 and Type 2. Type 1 resource allocation is a resource allocation procedure where resources for announcing of discovery information are allocated on a non UE specific basis. In Type 1, the eNB provides the UE(s) with the resource pool configuration used for announcing of discovery information. The configuration may be signaled in SIB. The UE autonomously selects radio resource(s) from the indicated resource pool and announce discovery information. The UE can announce discovery information on a randomly selected discovery resource during each discovery period. Type 2 resource allocation is a resource allocation procedure where resources for announcing of discovery information are allocated on a UE specific basis. In Type 2, the UE in RRC_CONNECTED may request resource(s) for announcing of discovery information from the eNB via RRC. The eNB assigns resource(s) via RRC. The resources are allocated within the resource pool that is configured in UEs for monitoring.

For UEs in RRC_IDLE, the eNB may provide a Type 1 resource pool for discovery information announcement in SIB. UEs that are authorized for Prose direct discovery use these resources for announcing discovery information in RRC_IDLE. Alternatively, the eNB may indicate in SIB that it supports ProSe direct discovery but does not provide resources for discovery information announcement. UEs need to enter RRC_CONNECTED in order to request resources for discovery information announcement.

For UEs in RRC_CONNECTED, a UE authorized to perform ProSe direct discovery announcement, when it needs to perform ProSe direct discovery announcement, indicates to the eNB that it wants to perform ProSe direct discovery announcement. The eNB validates whether the UE is authorized for ProSe direct discovery announcement using the UE context received from MME. The eNB may configure the UE to use a Type 1 resource pool or dedicated Type 2 resources for discovery information announcement via dedicated RRC signaling (or no resource). The resources allocated by the eNB are valid until a) the eNB de-configures the resource(s) by RRC signaling or b) the UE enters RRC_IDLE.

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

Synchronous and asynchronous deployments are supported. Discovery resources can be overlapping or non-overlapping across cells. The serving cell may provide in SIB information which neighbor frequencies support ProSe direct discovery. For synchronized, full-overlapping, intra-frequency deployment, the eNB provides just one resource pool (no D2D synchronization signal (D2DSS) information required).

Source ID, destination ID may be in front of the MAC PDU without MAC subheader. One D2D group may be composed of UEs supporting different MAC PDU formats. A MAC PDU format version number may be included in the first field of D2D MAC PDU. Separate HARQ entity for D2D may be configured. The UE may belong to multiple groups. It may be beneficial for the network to know which buffer status information is mapped to which D2D communication groups of a UE. Group index may be informed to the eNB by BSR (either explicitly or implicitly). The eNB may be aware of group ID, and mapping relation between group ID and group index. The UE may report group ID, and mapping relation between group ID and group index to the eNB.

Sidelink is UE to UE interface for ProSe direct communication and ProSe direct discovery. Sidelink comprises ProSe direct discovery and ProSe direct communication between UEs. Sidelink uses uplink resources and physical channel structure similar to uplink transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

A physical sidelink discovery channel (PSDCH), which carries ProSe direct discovery message from the UE, may be mapped to a sidelink discovery channel (SL-DCH). The SL-DCH is characterized by:

fixed size, pre-defined format periodic broadcast transmission;
support for both UE autonomous resource selection and scheduled resource allocation by eNB;
collision risk due to support of UE autonomous resource selection; no collision when UE is allocated dedicated resources by the eNB.

A physical sidelink shared channel (PSSCH), which carries data from a UE for ProSe direct communication, may be mapped to a sidelink shared channel (SL-SCH). The SL-SCH is characterized by:

support for broadcast transmission;
support for both UE autonomous resource selection and scheduled resource allocation by eNB;
collision risk due to support of UE autonomous resource selection; no collision when UE is allocated dedicated resources by the eNB;
support for HARQ combining, but no support for HARQ feedback;
support for dynamic link adaptation by varying the transmit power, modulation and coding.

A physical sidelink broadcast channel (PSBCH), which carries system and synchronization related information transmitted from the UE, may be mapped to a sidelink broadcast channel (SL-BCH). The SL-BCH is characterized by pre-defined transport format. A physical sidelink control channel (PSCCH) carries control from a UE for ProSe direct communication.

The SL-BCH may be mapped to a sidelink broadcast control channel (SBCCH), which is a sidelink channel for broadcasting sidelink system information from one UE to other UE(s). This channel is used only by ProSe direct communication capable UEs. The SL-SCH may be mapped to a sidelink traffic channel (STCH), which is a point-to-multipoint channel, for transfer of user information from one UE to other UEs. This channel is used only by ProSe direct communication capable UEs.

By combining BSR procedure and ProSe, ProSe BSR may be introduced. The ProSe BSR may be called a sidelink BSR. The ProSe BSR procedure is used to provide the serving eNB with information about the amount of ProSe data available for transmission in the UL buffers of the UE. RRC controls ProSe BSR reporting by configuring the two timers periodicBSR-Timer and retxBSR-Timer and by, for each ProSe logical channel, optionally signaling logical-ChannelGroup which allocates the logical channel to an LCG.

A ProSe BSR shall be triggered if any of the following events occur:

UL data, for a ProSe logical channel which belongs to a LCG, becomes available for transmission in the RLC entity or in the PDCP entity and either the data belongs to a ProSe logical channel with higher priority than the priorities of the ProSe logical channels which belong to any LCG and for which data is already available for transmission, or there is no data available for transmission for any of the ProSe logical channels which belong to a LCG, in which case the BSR is referred below to as "ProSe regular BSR";

UL resources are allocated and number of padding bits is equal to or larger than the size of the ProSe BSR MAC CE plus its subheader, in which case the ProSe BSR is referred below to as "padding ProSe BSR";

retxBSR-Timer expires and the UE has data available for transmission for any of the ProSe logical channels which belong to a LCG, in which case the BSR is referred below to as "ProSe regular BSR";

periodicBSR-Timer expires, in which case the BSR is referred below to as "ProSe periodic BSR".

According to introduction of ProSe BSR, a method for canceling the ProSe BSR may be needs to be newly defined. Hereinafter, a method for canceling triggered ProSe BSR according to an embodiment of the present invention. According an embodiment of the present invention, the MAC entity of the UE may trigger one or more ProSe BSRs, which become triggered ProSe BSRs for D2D communication, if ProSe BSR or Mode 1 operation is configured by RRC, and may cancel all triggered ProSe BSRs when at least one of the following events occurs.

ProSe BSR is de-configured by RRC: The RRC may de-configure ProSe BSR upon reception of handover command, upon RRC connection re-establishment, upon radio link failure, upon handover failure, upon occurrence of the exceptional case, or upon fallback from Mode 1 to Mode 2 operation.

Mode 1 operation is de-configured by RRC or the eNB: The RRC may de-configure Mode 1 operation upon reception of handover command, upon RRC Connection reestablishment, upon radio link failure, upon handover failure, upon occurrence of the exceptional case, or upon fallback from Mode 1 to Mode 2 operation.

One of exceptional cases is detected: The exceptional cases may include at least one of physical layer problem, radio link failure, expiry of a timer related to radio link failure, handover failure or expiry of a timer related to handover failure.

The UE falls back from Mode 1 to Mode 2 operation (since Mode 1 operation becomes impossible temporarily).

The UE moves outside of network coverage.

Reception of handover command

Initiation of RRC connection re-establishment

MAC reset

The UE enters RRC_IDLE.

Further, all triggered BSRs for non-D2D communication may not be canceled upon occurrence of one of the events above. Further, all pending SRs may not be canceled upon occurrence of one of the events above.

ProSe BSR may need not to be triggered before the eNB configures Mode 1 operation. For example, upon entering RRC_CONNECTED, the UE may not trigger ProSe BSR before the eNB configures Mode 1 operation. That is, from MAC perspective, ProSe BSR may be triggered only if Mode 1 operation is configured by RRC. ProSe BSR cannot be triggered if Mode 1 operation is de-configured by RRC, e.g. due to handover. All triggered ProSe BSRs may be canceled, if Mode 1 operation is deconfigured by RRC, e.g. due to handover.

In certain situations, the UE configured for Mode 1 operation may not perform D2D communication in Mode 1 due to some exceptional cases. In this case, it seems possible that the UE temporarily falls back to Mode 2 operation until the exceptional case disappears. As one option, the UE may keep the triggered BSRs in those exceptional cases, while the UE performs Mode 2 operation. However, there may be no real benefit of keeping the triggered ProSe BSRs in the UE for performing Mode 2 operation. It looks strange if the UE performing Mode 2 operation keeps the triggered ProSe BSRs. Further, a case that the recover from the exceptional cases is failed may be considered, so that the UE will go to RRC_IDLE and even the UE can move out of coverage.

Thus, the UE may not trigger ProSe BSRs when the exceptional case occurs, i.e. when the UE in RRC_CONNECTED falls from Mode 1 to Mode 2. In addition, all triggered ProSe BSRs may be canceled if UE in RRC_CONNECTED falls back from Mode 1 to Mode 2 e.g. due to exceptional cases. In the meantime, since the UE is not required to remember the reason why a certain pending SR was triggered, all pending SRs may not be canceled, even if all triggered ProSe BSRs are canceled e.g. due to either de-configuration or fall-back from Mode 1 to Mode 2.

FIG. 10 shows an example of a method for canceling a ProSe BSR according to an embodiment of the present invention. In step S100, the UE triggers at least one ProSe BSR. In step S110, the UE cancels all triggered ProSe BSRs when a physical layer problem or a radio link failure is detected. The ProSe BSR may be used for a mode 1 operation in which the eNB schedules resource allocation for D2D communication. The mode 1 operation or ProSe BSR may be configured by a RRC layer. When the physical layer problem or the radio link failure is detected, all triggered BSRs for non-D2D communication may not be canceled, and further, all pending SRs may not be canceled. The ProSe BSR may correspond to a sidelink BSR.

FIG. 11 shows another example of a method for canceling a ProSe BSR according to an embodiment of the present invention. In step S200, the UE triggers at least one ProSe BSR. In step S210, the UE cancels all triggered ProSe BSRs when one of events occur, while all pending SRs are not canceled. The events may include that the at least one ProSe BSR is de-configured by a RRC layer, that a mode 1 operation in which the eNB schedules resource allocation for D2D communication is de-configured by a RRC layer, that the UE falls back from a mode 1 operation to a mode 2 operation in which the UE selects resource for D2D communication autonomously, that the UE moves outside of a network coverage, initiation of RRC connection re-establishment, or that the UE enters an idle mode. All triggered BSRs for non-D2D communication may not be canceled upon occurrence of one of the events above.

FIG. 12 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for canceling, by a user equipment (UE), a proximity-based services (ProSe) buffer status report (BSR) in a wireless communication system, the method comprising:

triggering BSRs including both the ProSe BSR for device-to-device (D2D) communication and a non-ProSe BSR for non-D2D communication;

canceling all triggered ProSe BSRs among the triggered BSRs if a handover command message is received from the network; and keeping both all triggered non-ProSe BSRs among the triggered BSRs and all pending scheduling requests (SRs), while the all triggered ProSe BSRs are canceled, wherein the all triggered non-ProSe BSRs and the all pending SRs are not cancelled even if the handover command message is received from the network.

2. The method of claim 1, wherein the ProSe BSR is used for a mode 1 operation in which an evolved NodeB (eNB) schedules resource allocation for device-to-device (D2D) communication.

3. The method of claim 2, wherein the mode 1 operation is configured by a radio resource control (RRC) layer.

4. The method of claim 1, wherein the ProSe BSR, is configured by a radio resource control (RRC) layer.

5. The method of claim 1, wherein the ProSe BSR corresponds to a sidelink BSR.

6. The method of claim 4, further comprising:

canceling the all triggered ProSe BSRs if the ProSe BSR is de-configured by the RRC layer.

7. The method of claim 3, further comprising;

canceling the all triggered ProSe BSRs if the mode 1 operation is de-configured by the RRC layer.

8. The method of claim 2, further comprising:

canceling the all triggered ProSe BSRs if the UE falls back from the mode 1 operation to a mode 2 operation in which the UE selects resource for D2D communication autonomously.

9. The method of claim 1, further comprising:

canceling the all triggered ProSe BSRs if the UE moves outside of a network coverage.

10. The method of claim 1, further comprising:

canceling the all triggered ProSe BSRs if a radio resource control (RRC) connection re-establishment is initiated.

11. The method of claim 1, further comprising:

canceling the all triggered ProSe BSRs if the UE enters an idle mode.

* * * * *